July 9, 1957 D. F. BOUMA 2,798,399
PIPE ORGAN WIND CHEST AND VALVE ACTION
Filed May 28, 1954 2 Sheets-Sheet 1

INVENTOR.
Duncan F. Bouma
BY
Adams, Forward & McLean

July 9, 1957 D. F. BOUMA 2,798,399
PIPE ORGAN WIND CHEST AND VALVE ACTION
Filed May 28, 1954 2 Sheets-Sheet 2
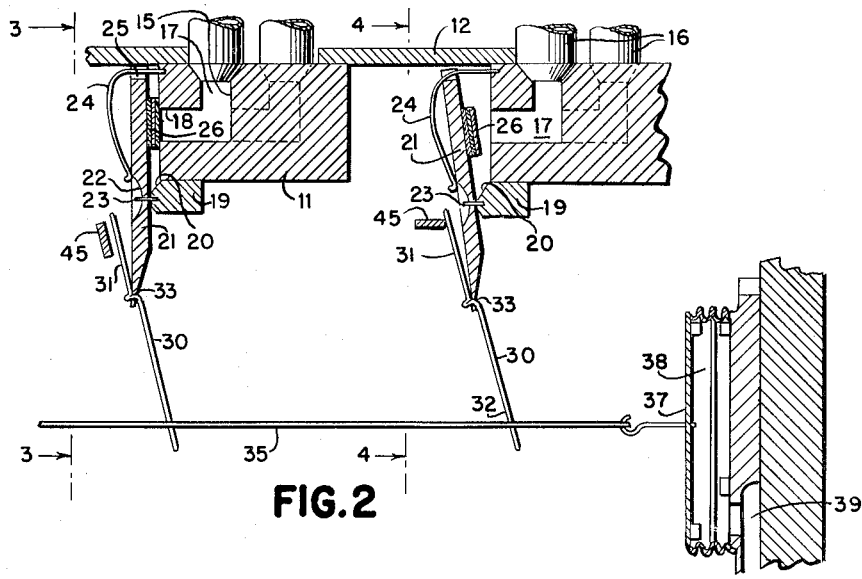
FIG.2
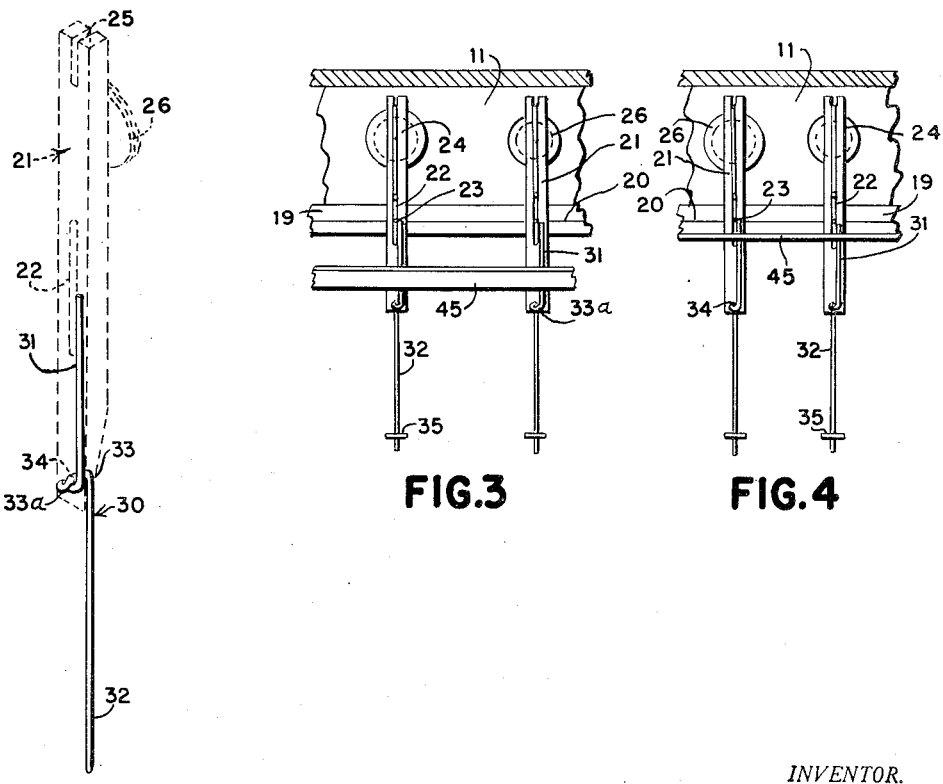
FIG.3  FIG.4
FIG.5
INVENTOR.
Duncan F. Bouma
BY
Adams, Forward & McLean

United States Patent Office 2,798,399
Patented July 9, 1957

2,798,399

PIPE ORGAN WIND CHEST AND VALVE ACTION

Duncan F. Bouma, Paterson, N. J.

Application May 28, 1954, Serial No. 433,041

6 Claims. (Cl. 84—335)

This invention relates to pipe organs and in particular provides a wind chest for pipe organs in which the valves and other working parts are readily accessible for replacement or repair.

It is a particular object of this invention to provide a pipe organ wind chest of simple internal construction having smooth, fast and reliable stop and key actuation of the speaking pipe valves.

These and other objects of the invention are essentially obtained by a novel speaking pipe valve action employing a lever to lift the valve cover from the wind duct leading from the interior of the wind chest to each speaking pipe and a toggle arm pivoted to the valve lifting lever in such a manner that key action alone will swing the toggle arm without exerting sufficient force on the lever to lift the valve cover and such that stop action introduces a second fulcrum for the action of the toggle arm whereby key action swings both the toggle arm and valve lifting lever in a compound action.

Heretofore, wind chest construction has generally required that the beam, i. e., pipe rail, upon which the rank of speaking pipes of a particular stop are supported be virtually honeycombed with a multitude of wind ducts to provide combined pneumatic stop and key action for each pipe. The use of these honeycombed beams is particularly disadvantageous in that the beams must be constructed of a number of laminated parts which must be disassembled in order to locate and repair faulty valve action. Thus, organ repair has heretofore been a cumbersome time-consuming operation even when the simplest of breakdowns occurs.

This invention permits the use of a solid beam of wood to support each rank of pipes in the basic organ. Only a single wind duct is required for each pipe and the valve is located along one side of the beam within the wind chest. The valve itself has only two freely moving parts, each of which can be made as durable as is desirable.

Key action for pipes of a given pitch is provided by a single tracker rod extending across a wind chest transversely of the stops and engaging each valve simply by an extension of the toggle arm through a hole in the tracker rod. Tracker actuation can be accomplished by a pneumatic or an electromagnetic relay, or both, located desirably along one side of the wind chest leaving the opposite side of the wind chest free for electrical circuits to produce coupling and other desirable functions Stop action is obtained for each rank of pipes by a single bar extending lengthwise of the rank and which is controlled in position by a pneumatic or an electromagnetic relay, or both, which can be located desirably in line with the relays controlling the other stops along a crossbeam utilized for intermediate side and top support of the wind chest or along one end of the wind chest.

Because of the simple construction involved in the wind chest of this invention, it is possible and in fact highly desirable to eliminate large obstructions within the center of the wind chest and thus permit the pressuring air to flow rapidly through open valves to their respective speaking pipes without substantial loss in pressure. As a result, the over-all air requirements can be met by blowers of as little as one half to one third the capacity normally required for a conventional wind chest.

At the same time visual inspection of all operating parts is readily accomplished by seating plate glass across a major portion of the underside of the wind chest held in air-tight seal by the internal air pressure of the chest. By installing lamps within the chest, it can thus be inspected with ease. Repairs can be made simply by removing a section of the glass bottom of the chest from its seat when the air supply is disconnected.

It has also been heretofore proposed to obviate the necessity of honeycombed pipe rails in a wind chest by utilizing mechanically or electromagnetically operated valves located within the wind chest exteriorly of the pipe rails. Some of such prior devices have involved complicated heavy actions with parts constantly under tension rendering them relatively inaccessible and difficult to disassemble and repair. Other such prior devices have involved spring stop action balancing a spring key action such that the force required to operate the key action substantially varies with the number of open stops and thus produces irregular timing of key action and other disadvantages.

The manner by which key and stop actions are combined to produce valve actuation following the principles of this invention obviates these difficulties and eliminates the necessity of springs and complicated valve structure with the single exception of a weak spring on each valve lifting lever utilized to hold the lever on a headless pivot pin to permit the valve lifting lever to be removed from its position simply by lifting it from such headless pin. The only force of any consequence holding the valves closed, aside from the very weak effect of such spring which is near the fulcrum of the lever, is the action of the internal air pressure holding the valve cover over the port of the wind duct leading to the speaking pipe.

For a more complete understanding of the principles of this invention, reference is made to the appended drawings which describe a specific wind chest formed in accordance with the principles of this invention and in which:

Figure 2 is a fragmentary view similar to that in Figure 1 illustrating in connection with Figure 1 the combined key and stop action in operation;

Figure 3 is a fragmentary side view of a pipe rail as seen from line 3—3 in Figure 2;

Figure 4 is a fragmentary side view of a pipe rail as seen from line 4—4 in Figure 2; and Figure 5 is an isometric view of the two operating parts of a valve constructed in accordance with this invention in which the toggle arm portion of the valve is shown in solid lines and the valve lever and cover are shown in dashed lines.

Figure 1:
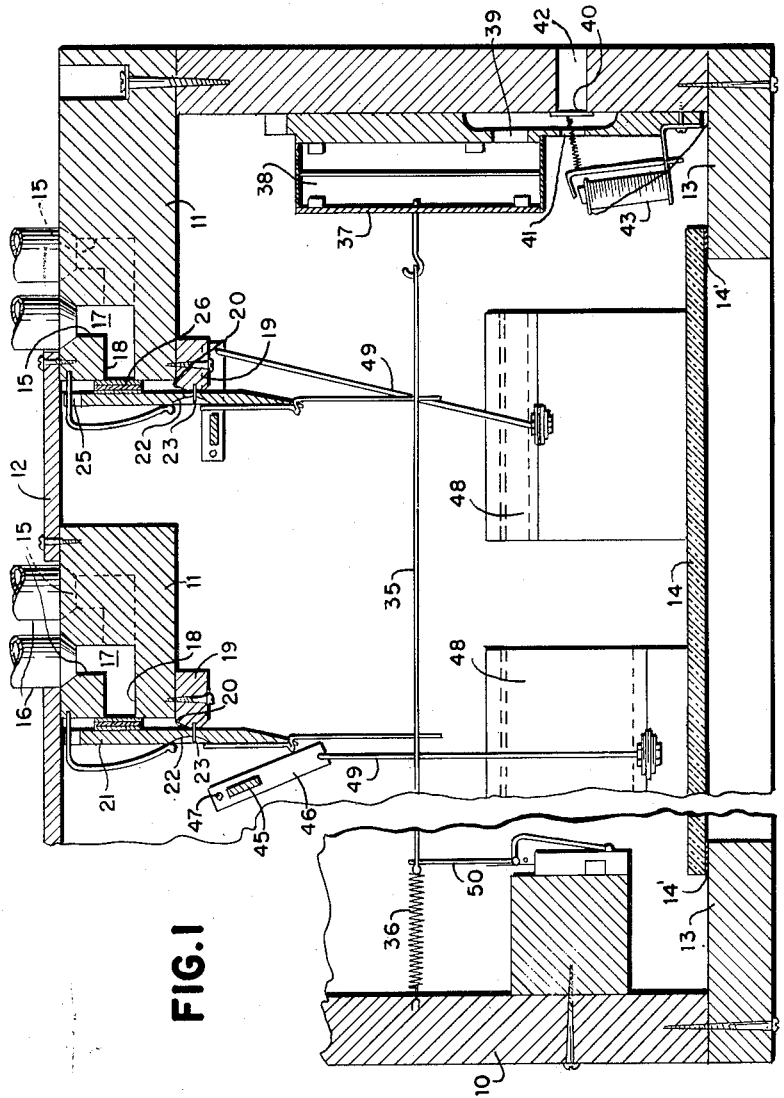
Figure 1 is a cross-section through the wind chest taken transversely of the ranks of pipes constituting each stop.

In the drawings the reference numeral 10 refers to a wind chest constructed in accordance with the principles of this invention.

Wind chest 10 is a rectangular box constructed of wood or other suitable material. Extending lengthwise of the top of wind chest 10 are a plurality of pipe rails 11. Usually five to about ten such pipe rails are employed. Pipe rails 11 are advantageously constructed of solid pieces of wood, and the spaces between rails 11 are covered by strips 12, also desirably formed of wood. The bottom of wind chest 10 is substantially open except along the edges which are provided with flanges 13. Suitable crossbeams (not shown) are placed in wind chest 10 to support pipe rails 11 and the sides of chest 10. Between such supports the bottom is closed with sections 14 of plate glass which rest at their edges on flanges 13 suitably gasketed with strips of felt 14'. Conventional bellows or blowers (not shown) are connected to the wind chest to supply the requisite air pressure.

Each pipe rail 11 is provided with a series of pipe registers 15 located along its upper surface and into which speaking pipes 16 are mounted. Speaking pipes 16 are disposed along pipe rails 11 in the conventional manner preferably staggered in order to accommodate the greatest possible number of pipes 16 within a given space. Because of the close spacing permissible, as many as 700 or 800 speaking pipes constituting a full basic organ can be accommodated on a wind chest having external horizontal measurements of eight feet by four feet.

Pipes 16 having the same pitch are aligned transversely of wind chest 10. (Figures 1 and 2 are cross-sections through wind chest 10 along a line of pipes 16 having the same pitch.) It will be noted that each register 15 is connected through a right angled wind duct 17 to a valve port 18 located along the side of its respective pipe rail 11 and within wind chest 10. A strip of wood 19 having a pointed edge 20 extends lengthwise along the bottom of each pipe rail 11 with pointed edge 20 projecting slightly beyond the edge of the bottom of rail 11 on the side along which ports 18 are located.

An elongated lever member 21, shown most clearly in dashed lines in Figure 5, is pivoted on pointed edge 20 in upright position across each port 18. Vertical recess 22 is provided in the rear face of valve lever 21 positioned centrally of the point at which lever 21 pivots on edge 20. A headless pin 23 passing through a hole extending between the pivot face of lever 21 and recess 22 is affixed in edge 20 of strip 19. A feeble bent spring 24 affixed in pipe rail 11 above port 18 freely passes through a vertical slot 25 at the upper end of lever 21 and extends downwardly, spaced from the rear face of lever 21, and engages lever 21 in recessed slot 22. A slight pressure is employed in such engagement in order to hold lever 21 on pin 23. Thus the combined functions of spring 24, recess 22 and pin 23 is to secure lever 21 in its pivotal connection to strip 19 such that lever 21 will swing away from port 18 in a vertical plane approximately perpendicular to the side of rail 11 which contains port 18.

The valve is completed by a circular valve cover 26 affixed to the vertical pivoting face of lever 21 in such a position that cover 26 will close port 18 with a slight overlap when lever 21 is in a vertical position. Ordinarily lever 21 is made of wood or molded synthetic materials. Cover 25 is constructed in the conventional manner having a felt striking surface backed by leather or similar material having sufficient rigidity to support the felt surface.

A uniquely shaped piece of wire 30, shown most clearly in solid lines in Figure 5, is pivotally supported to, and freely hangs from, the lower end of valve lever 21, acting as a toggle arm in the valve action as more fully explained hereinafter. Wire 30 includes a pair of parallel shanks 31 and 32, upper shank 31 being somewhat shorter than lower shank 32. Shanks 31 and 32 are connected by an integrally formed stub 33 connected to the upper end of shank 32 and at right angles thereto. Stub 33 passes freely through a small opening 34 at the lower end of valve lever 21. A loop 33a is formed at the other end of stub 33. It then is joined at right angles to shank 31. Loop 33a thus prevents toggle arm 30 from slipping through opening 34 while the heavier end 32 of toggle arm 30 and the right angle construction of stub 33 causes toggle arm 30 normally to hang vertically aligned with lever arm 21 when the latter is at its normal closed position. Opening 34 is of sufficient diameter in excess of the diameter of stub 33 to permit toggle arm 30 to swing pivotally with respect to the lower end of lever 21.

For each transversely aligned set of ports 18 and valves, there is a related key action which simultaneously operates all valves of the same pitch. The key action essentially includes a horizontal tracker rod 35, formed of a strip of material such as wood, transversely positioned across the wind chest, anchored at one end to a coil spring 36 and affixed at its opposite end to a pneumatic 37. The tracker 35 is provided with small vertical holes which in the unactuated position are aligned vertically with valve levers 21 and toggle arms 30. Each shank 32 rests freely at its lower end in one of such holes. Pneumatic 37 is operatively connected to the digitals or pedals, or both, of the organ console (not shown) by suitable mechanical or electromagnetic linkages. As shown, pneumatic 37 includes bellows 38 affixed to the side of wind chest 10 with its interior connected to a passage 39 leading to a two-way electromagnetically controlled valve 40. Valve 40 in actuated position closes a passage 41 connecting passage 39 with the interior of wind chest 10 and opens a passage 42 connecting passage 39 with the exterior of the wind chest. Operation of valve 40 is produced by electrical connection with a digital or pedal at the console closing a circuit through magnet 43.

In actual construction there is a pneumatic 37 and associated tracker rod 35 for each note in the range of the organ. Only one magnet 43 is thus required for each set of speaking pipes 16 having the same pitch, whereas in electromagnetically operated organs of prior construction, a separate electromagnetic relay is customarily required for each pipe.

Stop action is obtained by a pivotally mounted bar 45 extending lengthwise through wind chest 10 along each pipe rail 11. Suitably, stop bars 45 are mounted on lever members 46 located at opposite ends of wind chest 10 and pivoted thereto at ends 47 so that stop bar 45 by oscillation of levers 46 can be rotated from a position relatively removed from the valves to a position relatively close to the valves, as more fully described below.

Each stop bar 45 has at least one lever 46 through which the bar is controlled by connection to a pneumatic or other stop mechanism operated remotely at the console. In the illustrated case a series of stop pneumatics 48, capable of vertical motion as illustrated by the two positions shown in Figure 1, are disposed along one end of the wind chest or along a crossbeam. Each pneumatic 48 is connected to a lever 46 on a stop bar 45 by a linkage 49 adjusted so that in unactuated position, stop bar 45 will not interfere with free movement of toggle arm 30 under the influence of tracker 35, but in actuated position stop bar 45 will be positioned relatively close to the upper end of toggle arm 30 such that actuation of tracker 35 by key pneumatic 37 will cause toggle arm 30 to strike stop bar 45. Additional electrical functions are suitably obtained by a multiple switch connection operated through a pivotable lever 50 operatively engaged with tracker rod 35.

Figure 1 shows a key pneumatic 37 in unactuated position and Figure 2 shows the same pneumatic 37 in actuated position. In both figures, the left-hand stop bar 45 is in unactuated position, and the right-hand stop bar 45 is in actuated position. A study of these figures shows (see Figure 1) that where pneumatic 37 is unactuated, valve covers 26 are closed over ports 18 by the slight pressure of spring 24 and by the stronger action of the air pressure within wind chest 10, regardless of the position of stop bar 45. When, however (see Figure 2), key pneumatic 37 is actuated, tracker 35 draws the lower shanks 32 of toggle arms 30 out of alignment with lever arms 21. When stop bar 45 is in unactuated position, this movement of the lightweight toggle arm 30 is insufficient to overcome the air pressure biasing of the valve. When, however, stop bar 45 is thrown to the actuated position, the movement of tracker 35 is greater than the distance that shank 31 forming the upper portion of toggle arm 30 can swing about its pivotal connection to lever 21 without interference by stop bar 45. Thus the remainder of movement of toggle arm 30 after striking stop bar 45 is about the different fulcrum introduced by stop bar 45, and a horizontal component of force sufficient to overcome the air pressure biasing of the valve is exerted at the lower end of lever 21 causing it to pivot on pin 23 and lift valve cap 26 from port 18, admitting air from wind chest 10 through wind duct 17 and into speaking pipe 16 associated with the opened valve.

The number of permissible variations obtaining the foregoing valve action are of course almost without limit. Often it is desirable to provide additional actuation of a given speaking pipe, for example, at an octave lower or higher on the manuals or pedal clavier. This can be readily accomplished by providing additional wind ducts diagonally through each pipe rail 11 with ports in the reverse side of rail 11 from the principal ports, aligned with trackers actuated an octave lower or higher, or as desired, so that by construction of a similar valve on the reverse side of the rail a special stop can be utilized to couple the operation of pipes of different notes in a given rank. Since the operation of the tracker is unchanged, valve actuation is most suitably obtained by reversing the relative positions of cap 26 and pivot pin 23 on lever 21 and by positioning cap 26 on the reverse, non-pivoting face of lever 21.

The construction of toggle arm 30 can be formed from molded synthetic materials, as well as wire, and it can even be formed in several pieces rather than as an integral piece. It must be substantially rigid and advantageously of as little weight as possible, however constructed.

I claim:

1. A wind chest for a pipe organ which comprises a closed hollow chest, means for delivering air under pressure to said chest, a plurality of pipe supporting beams extending lengthwise in the top of the chest, a series of wind ducts in each said beam, each said duct having a port within the chest along a side of the beam and a pipe register opening exteriorly of the chest along the top of the beam, said ports in each beam being aligned transversely of the chest, an elongated valve lever in vertical position across the interior port of each said duct, pivotally connected to said chest for swinging movement in a vertical plane away from said port, a valve closure element secured to the side of each said lever closing the associated port when said lever is in a vertical position, a toggle arm pivotally connected at a point intermediate of its ends to the lower end of said lever for swinging movement in approximately the same plane as said lever, an elongated stop-actuated member disposed in said chest along each said beam having one position permitting swinging movement of the toggle arms on the valve levers associated with said beam about the pivotal connection of said toggle arms to said levers and a second position hindering the swinging movement of said toggle arms about said levers establishing a second fulcrum of movement for each said toggle arm located above the pivotal connection thereof to its associated lever, whereby said levers along each said beam remain vertical upon swinging movement of said toggle arms when the associated stop member is in said first position and swing with said toggle arms when said stop member is in said second position, a series of key-actuated tracker rods disposed horizontally across said chest aligned beneath said transversely aligned ports, each said tracker rod engaging the lower ends of the toggle arms of the valve levers associated with the respective aligned ports, said tracker rods being reciprocable lengthwise between a first position in which said toggle arms hang vertically aligned with their respective valve levers and a second position in which said toggle arms are drawn through a sufficient arc to lift the valve closure elements associated therewith when said stop members are in the second position, independent stop means for actuating each said stop member between its two positions, and independent key means for actuating each said tracker rod between its two positions.

2. A wind chest according to claim 1 in which the valve levers are each pivotally connected to the wind chest by a headless pin projecting from said beam and extending into a transverse opening in said lever and in which said levers are each held in place on said pins by an elongated resilient member passing through a guide slot in the upper end of said lever having one end affixed to said beam and having its other end resting under slight tension against the side of said lever opposite said pivotal connection.

3. A wind chest according to claim 1 in which the valve levers are each pivotally connected to said wind chest at a point below their associated ports.

4. In a valve for a pipe organ the improvement which comprises an elongated valve lever, means on said lever for pivotal connection thereof to a fixed pivot point providing swinging movement of said lever about an axis perpendicular thereto, a valve closure element secured to the side of said lever, and a toggle arm pivotally connected at a point intermediate of its ends to one end of said lever for swinging movement in approximately the same plane as the swinging movement of said lever about its pivot point.

5. In a valve for a pipe organ the improvement which comprises an elongated valve lever, means on said lever for pivotal connection thereof to a fixed pivot point providing swinging movement of said lever about an axis perpendicular thereto, a valve closure element secured to the side of said lever, a transverse opening in said lever at the lower end thereof, and a toggle arm comprising an elongated straight shank, a pivot stub affixed at one end thereof to one end of said shank at approximately right angles thereto, a second elongated straight shank shorter than said first shank affixed at one end to the other end of said stub extending from said stub in a direction opposite said first shank and parallel thereto and stop means positioned at the connection of said second shank to said stub, said toggle arm resting with its pivot stub passing through the opening at the lower end of said lever for swinging movement of said toggle arm in approximately the same plane as the swinging movement of said lever about its pivot point.

6. A toggle arm for a pipe organ valve which comprises an elongated straight shank, a pivot stub affixed at one end thereof to one end of said shank at approximately right angles thereto, a second elongated straight shank shorter than said first shank affixed at one end to the other end of said stub extending from said stub in a direction opposite said first shank and parallel thereto, and stop means positioned at the connection of said second shank to said stub.

References Cited in the file of this patent
UNITED STATES PATENTS
537,664   Austin ---------------- Apr. 16, 1895